United States Patent Office

3,150,039
Patented Sept. 22, 1964

3,150,039
INSECTICIDAL METHOD USING BOTH PYRO-
PHOSPHORIC AND POLYPHOSPHORIC ACID
PARTIAL ESTER AMMONIUM SALTS AND
PROCESS FOR PREPARING SAME
William M. Lanham, Charleston, and Percy L. Smith,
Dunbar, W. Va., assignors to Union Carbide Corporation, a corporation of New York
No Drawing. Filed Nov. 16, 1960, Ser. No. 69,556
7 Claims. (Cl. 167—22)

This invention relates to anhydrides of phosphorus containing acids and to the process of making the same.

It is an object of this invention to prepare new products which have been found to be particularly useful as insecticides, said products being prepared by the reaction of a phosphoric acid amide and a phosphoric acid.

The present invention is based on our discovery that novel salts of anhydrides of phosphorus acids may be prepared by reacting an amide having the general formula:

(1) 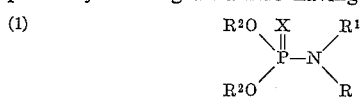

wherein R and $R^1$ may be hydrogen, an alkyl or aryl radical, X may be oxygen or sulfur and $R^2$ may be an alkyl or an aryl radical and the two $R^2$ radicals taken together may be an alkylene radical such as a 1,3 alkylene group, with an acid having the general formula:

$$H[-O-\underset{\underset{OH}{|}}{\overset{\overset{O}{\|}}{P}}-]_nOH$$

wherein $n$ is an integer from 1 to 5. The anhydrides obtained by this reaction contain one or two more phosphorus atoms than the starting acid. The exact mechanism of the reaction is not completely known. However, it is believed that the reactions involved may be represented as follows:

1. PHOSPHORIC ACID AS A REACTANT (2) 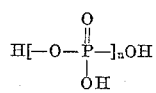

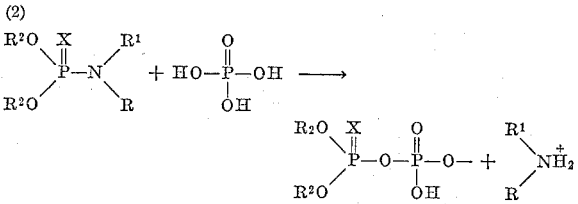

(See Examples Nos. 1, 3, 8, 9, 11, 12, 17, 19, 23, 27 and 30.)

(3)

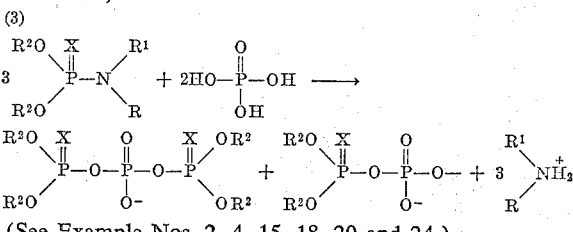

(See Example Nos. 2, 4, 15, 18, 20 and 24.)

2. PYROPHOSPHORIC ACID AS A REACTANT (4)

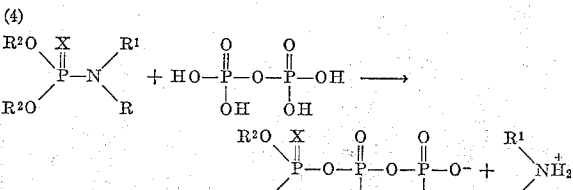

(See Examples Nos. 5, 21, 25, 28 and 29.)

(5)

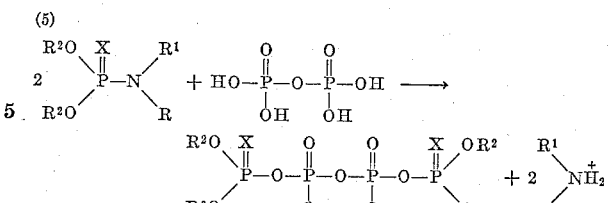

(See Examples Nos. 14, 16, 22, and 26.)

3. POLYPHOSPHORIC ACID AS A REACTANT (6)

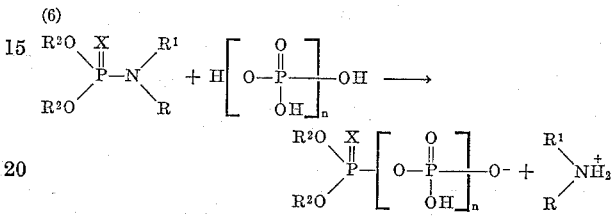

(See Example Nos. 6, 7 and 10.)

(7)

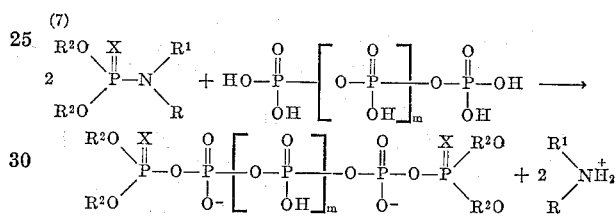

(See Example No. 13.)

In the above equations, R, $R^1$, $R^2$, X and $n$ have the same significance as do R, $R^1$, $R^2$, X and $n$ as previously defined in the foregoing general Formula 1 and $m$ is an integer from 1 to 3.

The products of this invention may be prepared by mixing the reactants together in a bottle at room temperature and allowing to stand till the reaction is complete. If desired, the reaction can be hastened by heating from 25° C. to 100° C. A reaction temperature of 25° C. to 50° C. is preferred.

Although a catalyst is not necessary to carry out the process of this invention, the reaction can be accelerated by the addition of a suitable catalyst such as water, perchloric acid, $BF_3$-etherate, benzyltrimethylammonium hydroxide and p-toluenesulfonic acid. Although water is by far the best catalyst, it must be used with care since it may react with many of the anhydride products.

A solvent for the reactants, while not necessary, can be employed. Inert solvents, such as ethyl acetate, dioxane, acetonitrile, and the like are preferred. Water and alcohols, such as methanol, ethanol, isopropanol, etc. are prone to react with some of the anhydride products and therefore, should be used with caution.

The order of addition of the reactants is not important. Therefore, the amide may be added to the acid or the acid may be added to the amide. Some of the reactions are exothermic while others are endothermic. Sometimes, the reaction mixture spontaneously cools initially and then suddenly begins to heat. When phosphoric acid is employed as a reactant, the reaction can be followed by periodic sampling and determining the salt content by titration with 0.1 N perchloric acid in acetic acid medium. However, it has been found that pyro- and polyphosphoric acids, which are stronger acids than orthophosphoric acid, are strong enough to interfere with the titration and even the products obtained by their reaction with amidophosphates and sometimes are insufficiently basic to titrate quantitatively. In such cases it is expedient to follow the reaction by determining the acid content of the reaction mixture. This is readily accomplished by dissolving a sample either in anhydrous ethanol or an ethanol-water mixture and immediately titrating the solution with standard 0.1 N methanolic sodium hydroxide using bromcresol green-methyl red mixed indicator (pH range=4.6–5.8). This method of analysis titrates two hydrogens on pyro- and ($m-2$) hydrogens on a polyphosphoric acid containing ($m$) hydrogens. Reaction of these acids with an amidophosphate is attended by a decrease in acid content. For example, Equation 8 illustrates the probable reaction between a 1:1 molar ratio of pyrophosphoric acid and a dialkyl amidophosphate. If no reaction occurs, two equivalents of acid will be titrated per mol of pyrophosphoric acid. When the reaction is complete, one equivalent of acid will be titrated per mol of starting acid. The amidophosphate is neutral and does not interfere.

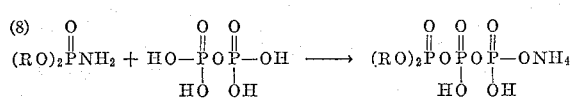

As Equation 3 above indicates, a mixture of products is sometimes obtained by the process of this invention. Occasionally, complete reaction of the initial reactants is not easily accomplished so that the product may contain some unreacted acid and amide. Most of the products of this invention are sticky solids or semi-solids which are insoluble in most common inert organic solvents. The products of the invention can be employed directly as the active ingredient in insecticidal compositions and therefore do not need to be purified. However, it is pertinent to note that the amines or ammonium salts of this invention can be converted readily into the corresponding phosphorus acids by treatment with a cation exchange resin such as amberlite 1R–120.

The following examples illustrate preferred embodiments of this invention:

Example 1

Into a 4-ounce, wide-mouth bottle containing 30.8 g. (0.2 mol) of diethyl amidophosphate was poured 23 g. of 85 percent orthophosphoric acid (0.2 mol of $H_3PO_4$ and 0.189 mol of water). The reaction mixture was agitated using a thermometer and cooled using an ice water bath in order to maintain the reaction temperature at 25° C. The salt content[1] of the reaction mixture, a white water-soluble slurry, was found to be (after standing at 25° for about one year) 3.74 milliequivalents of perchloric acid per gram=0.2 equivalent (theory=0.2 if the reaction illustrated below took place quantitatively).

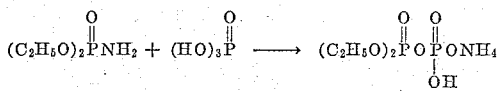

Example 2

Into a 4-ounce, wide-mouth bottle was charged 41.4 (0.269 mol) of diethyl amidophosphate and 15.5 g. of 85 percent orthophosphoric acid (0.134 mol of $H_3PO_4$ and 0.128 mol of water). There was no apparent heat of reaction. After standing at 25° for 1.5 hours, the reaction mixture was heated momentarily at 50°. The salt content of the reaction mixture, a water soluble mixture of white solid and clear liquid, was found to be (after standing at 25° for about one year) 3.28 milliequivalents of perchloric acid per gram=0.197 equivalent (theory

[1] Since this product is insoluble in acetic acid, the conventional method for determining salt content was modified. This modified method involves use of a formic-acetic acid mixture as the solvent.

=0.197 equivalent if the following reaction took place quantitatively).

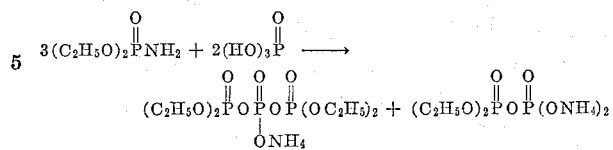

Example 3

Into a 4-ounce bottle containing 31.4 g. (0.15 mol) of dibutyl amidophosphate was poured 17.3 g. of 85 percent orthophosphoric acid (0.15 mol of $H_3PO_4$ and 0.144 mol of water). The resulting solution was agitated with a thermometer and cooled in a wet ice bath in order to maintain the reaction temperature at 25°. Upon standing over night at 25°, the reaction mixture separated into a white solid bottom layer and a colorless liquid top layer. The salt content of the reaction mixture was found to be (after standing about one year) 2.94 milliequivalents of perchloric acid per gram=0.143 equivalent (theory=0.15 equivalent if the following reaction took place quantitatively).

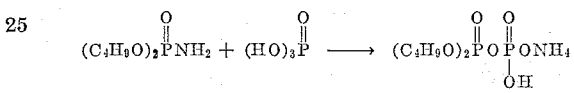

Example 4

Into a 4-ounce bottle containing 31.4 g. (0.15 mol) of dibutyl amidophosphate was poured 8.7 g. of 85 percent orthophosphoric acid (0.075 mol of $H_3PO_4$ and 0.075 mol of water). The resulting solution was agitated with a thermometer and cooled in a wet ice bath in order to maintain the reaction temperature at 25°. Upon standing over night at 25°, the reaction mixture separated into a white solid bottom layer and a colorless liquid top layer. The salt content of the reaction mixture was found to be (after standing about one year) 2.93 milliequivalents of perchloric acid per gram=0.118 equivalent (theory=0.113 equivalent if the following reaction took place quantitatively).

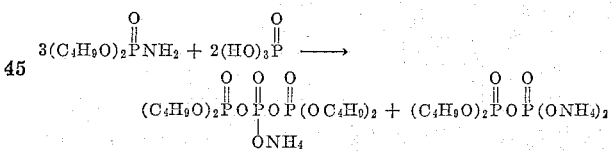

Example 5

Into 53 g. (0.71 equivalent of acid as determined by an acidity determination using bromcresol green-methyl red mixed indicator) of impure agitated pyrophosphoric acid (prepared by the dehydration of anhydrous orthophosphoric acid) was added, intermittently, 46 g. (0.3 mol) of diethyl amidophosphate over a period of 10 minutes. It was necessary to cool the reaction mixture during this addition in order to maintain the reaction temperature at 100° C. After the addition the reaction mixture was agitated at 100° for an additional 0.5 hour. Upon standing at 25° C. for about 3 months, the acid content of the resultant gray, mushy solid was found to be (using bromcresol green-methyl red mixed indicator) 4.64 milliequivalents of base per gram=0.459 equivalent, indicating that 0.251 mol of diethyl amidophosphate had reacted, presumably according to the equation illustrated below.

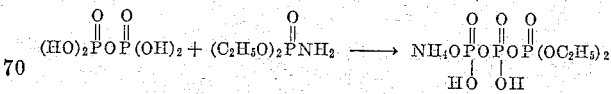

Example 6

One-tenth mol (15 g.) of diethyl amidophosphate and 35 g. (0.4 equivalent of acid as determined by an acidity determination using bromcresol green-methyl red mixed indicator) of polyphosphoric acid were mixed together at 25° C. in a 4-ounce bottle. The reaction mixture was allowed to stand at 25° C. for about 17 days and the acid content of the resultant taffy-life solid was found to be (using bromcresol green-methyl red mixed indicator) 7.45 milliequivalents of base per gram=0.37 equivalent, indicating that about 0.03 mol of diethyl amidophosphate had reacted, presumably according to the equation illustrated below:

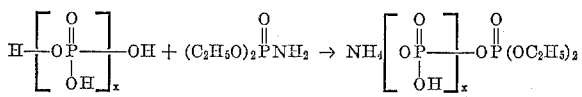

*Example 7*

Into 12.7 g. (0.145 equivalent of acid as determined by an acidity determination using bromcresol green-methyl red mixed indicator) of agitated polyphosphoric acid was added slowly 7.5 g. (0.036 mol) of dibutyl amidophosphate. The reaction was exothermic and the reaction temperature was allowed to increase from 25° C. to 50° C., at which temperature it was maintained by cooling with a wet ice bath. After the addition the reaction mixture was allowed to stand at 25° C. for about 18 days and the acid content of the resultant white, sticky paste was found to be 6.29 milliequivalents of base per gram=0.127 equivalent, indicating that 0.018 mol of dibutyl amidophosphate had reacted, presumably according to the equation illustrated below.

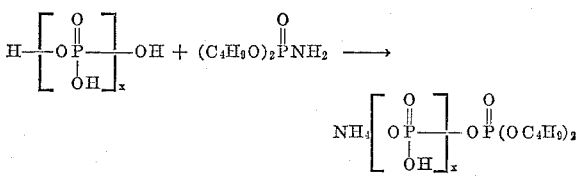

*Example 8*

Three-tenths mol (34.6 g.) of syrupy phosphoric acid containing 14.7 percent (by weight) water was added to 46 g. (0.3 mol) of diethyl amidophosphate over a period of 2 minutes and the reaction temperature dropped from 25° C. to 20° C. After the addition, the reaction mixture was allowed to stand at 25° C. for about 6 days and heated at 50° C. for 6 hours. The salt content of the resultant solid-liquid mixture was found to be 3.67 milliequivalents of perchloric acid per gram=0.295 equivalent (theory=0.3 equivalent if the following reaction (A) took place). Upon standing at 25° C. for about 2 months, it was found that the reaction mixture contained 1.3 percent water (theory=6.3 percent water if the water in the syrupy phosphoric acid had not reacted with the product). The water analysis indicates that 0.22 mol of the pyrophosphate reacted with water according to Equation (B) below.

(A)

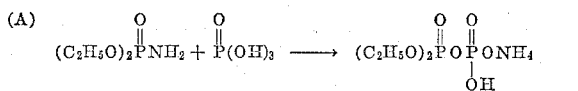

(B)

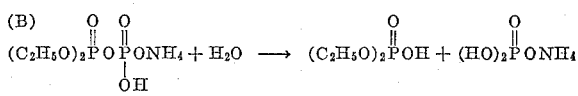

*Example 9*

Into 19.6 g. (0.2 mol) of agitated anhydrous phosphoric acid was added, dropwise, 36.3 g. (0.2 mol) of diethyl dimethylamidophosphate over a period of 8 minutes. It was necessary to cool the reaction mixture throughout this addition in order to maintain the reaction temperature at 25° C. After the addition, the reaction mixture was agitated at 25° C. for 3 hours and allowed to stand over night at 25° C. The salt content of the resultant liquid mixture was found to be 2.29 milliequivalents of perchloric acid per gram=0.128 equivalent (theory=0.20 if the following reaction went to completion).

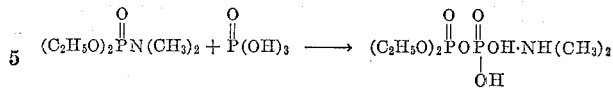

*Example 10*

Into 35.4 g. (0.405 equivalent of acid as determined by an acidity determination using bromcresol green-methyl red mixed indicator) of agitated polyphosphoric acid was dropped 18.1 g. (0.1 mol) of diethyl dimethylamidophosphoate over a period of 7 minutes. The addition was begun at a reaction temperature of 25° C. but the temperature reached 60° C. and was held there by cooling with a dry ice-acetone bath throughout most of the addition. After the addition the reaction mixture was maintained at 60–70° C. for 1 hour and allowed to stand at 25° C. for about 29 days. The acid content of the resultant clear, tacky residue was found to be (using bromcresol green-methyl red mixed indicator) 6.82 milliequivalents of base/gram=0.364 equivalent, indicating that 0.041 mol of diethyl dimethylamidophosphoate had reacted, presumably according to the equation illustrated below.

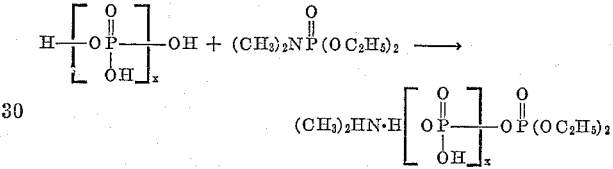

*Example 11*

To an agitated solution consisting of 12 g. (0.12 mol) of anhydrous phosphoric acid and 12 g. (0.67 mol) of water was added 34 g. (0.12 mol) of dibutyl butylamidophosphate at a reaction temperature of 25–27° C. over a period of 2 minutes. After the addition the heterogeneous reaction mixture, which was homogeneous after about 150 hours, was allowed to stand at 25° C. and periodic samples were removed and titrated for salt and water content. From the salt content, the percent completion of the reaction illustrated by Equation A below was calculated and from the water analysis, the percent completion of the reaction shown by Equation B below also was calculated. The following is a log of the reaction:

| Total Time in Hours After Addition | Percent Completion of— | |
|---|---|---|
| | Reaction (A) | Reaction (B) |
| 5.5 | 6.7 | |
| 94.5 | 55.4 | 58.4 |
| 197.5 | 78.3 | 36.3 |
| 293.5 | 91.4 | |
| 315.5 | 94.8 | |
| 361.5 | 95.2 | |
| 364.0 | | 98.4 |

(A)

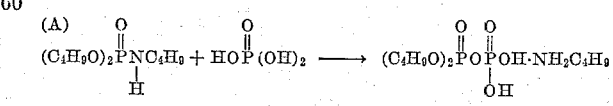

(B)

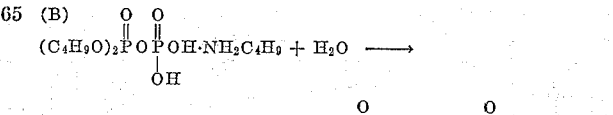

*Example 12*

Into 52.5 g. (0.163 mol) of agitated di-(2-ethylhexyl) amidophosphate was added all at once 16 g. (0.163 mol) of anhydrous phosphoric acid. The reaction temperature slowly went from 25° to 36° C. After the addition the reaction mixture was heated at 100° C. for a period of 15.5 hours and allowed to stand at 25° C. for about 1 month. The salt content of the resultant liquid-solid reaction mixture was found to be 0.61 milliequivalent of perchloric acid per gram=0.041 equivalent (theory=0.163 equivalent if the following reaction had gone to completion).

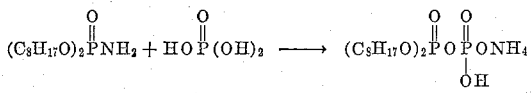

*Example 13*

Into 17.7 g. (0.203 equivalent as determined by an acidity determination using bromcresol green-methyl red mixed indicator) of agitated polyphosphoric acid held at 50° C. was added, dropwise, 18.1 g. (0.1 mol) of diethyl dimethylamidophosphate over a period of 8 minutes. The resulting colorless, viscous reaction mixture was allowed to stand at 25° C. for 22 days. The acid content, determined in the same manner as the polyphosphoric acid reactant, was found to be 3.40 milliequivalents of KOH per gram=0.122 equivalent, indicating that 0.081 equivalent of acid was lost by reaction. Therefore, if reaction took place as indicated below, the reaction had reached 81 percent completion.

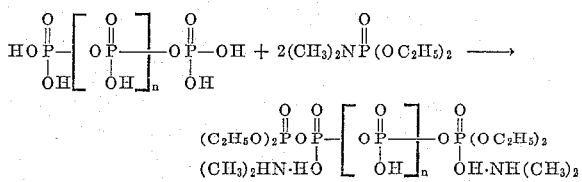

*Example 14*

Into 17.8 g. (0.242 equivalent of acid as determined by an acidity determination using bromcresol green-methyl red mixed indicator) of pyrophosphoric acid held at 40–50° C. was dropped 36.2 g. (0.2 mol) of diethyl dimethylamidophosphate over a period of 15 minutes. The resulting hazy, brown, fluid reaction mixture was allowed to stand at 25° C. for a period of 15 days. The acid content, determined in the same manner as the pyrophosphoric acid reactant, was found to be 0.86 milliequivalent of KOH per gram=0.046 equivalent, indicating that if the reaction took place as illustrated below, it had reached 98 percent completion.

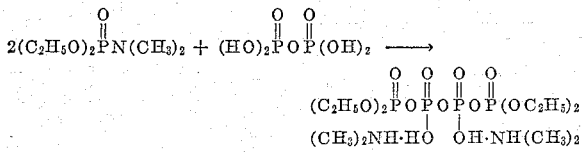

*Example 15*

11 g. (0.112 mol) of anhydrous phosphoric acid was added, all at one time, to 54 g. (0.168 mol) of agitated di-(2-ethylhexyl) amidophosphate. The reaction temperature rose slowly from 25° to 36° C. After the addition, the reaction mixture was held at 25° C. for about 28 hours, heated at 100° C. for 2 hours, allowed to stand at 25° C. for about 64 hours, and heated at 100° C. for another 7 hours. The salt content of the resultant product, a light brown suspension of mushy solid and liquid, was found to be 0.67 milliequivalent of perchloric acid per gram=0.044 equivalent, which is 39 percent of the theoretical for completion of the reaction illustrated below.

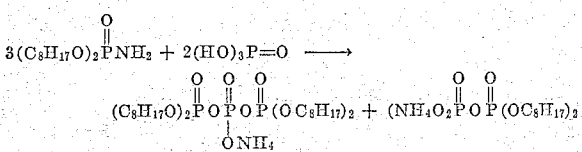

*Example 16*

Into 50.5 g. of agitated di-(2-ethylhexyl) amidophosphate was added, all at one time, 14.0 g. (0.188 equivalent of acid as determined by an acidity determination using bromcresol green-methyl red mixed indicator) of pyrophosphoric acid. The reaction temperature immediately went from 25° to 41° C. and the reaction mixture was viscous and gelatinous. During the next 30 days, the reaction mixture was heated intermittently a total of 44 hours at 100° C. The acid content, determined in the same manner as the pyrophosphoric acid reactant, was found to be 0.786 milliequivalent of KOH per gram=0.051 equivalent, indicating that the reaction illustrated below had reached about 87 percent completion.

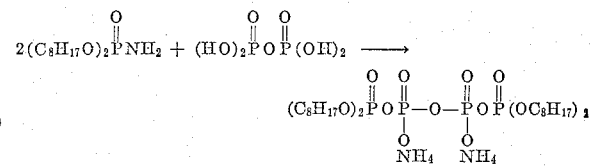

*Example 17*

Into 56 g. (0.204 mol) of agitated dibutyl butylamidophosphate was added 20 g. (0.204 mol) of anhydrous phosphoric acid over a period of 5 minutes. The reaction temperature went from 25° to 45° C. After stirring the homogeneous reaction mixture at 25° C. for 2 hours and standing over night at 25° C., the salt content was found to be 0.786 milliequivalent of perchloric acid per gram=0.06 equivalent (theory=0.204 equivalent for completion of the following reaction).

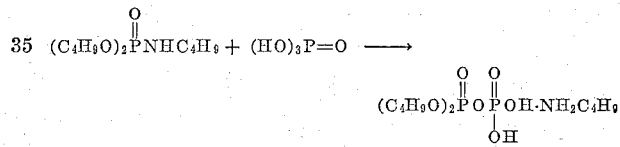

*Example 18*

Into 67.5 g. (0.245 mol) of agitated dibutyl butylamidophosphate was added 16 g. (0.163 mol) of anhydrous phosphoric acid over a period of 3 minutes. The reaction temperature went from 25° to 44° C. After stirring the homogeneous reaction mixture at 25° C. for 85 minutes, allowing to stand at 25° C. over night, and heating at 100° C. for 50 minutes it became a mushy solid. Upon heating at 100° C. for another 20 hours, the salt content of the tan, mushy solid was found to be 1.21 milliequivalents of perchloric acid per gram=0.101 equivalent (theory=0.245 equivalent for completion of the following reaction).

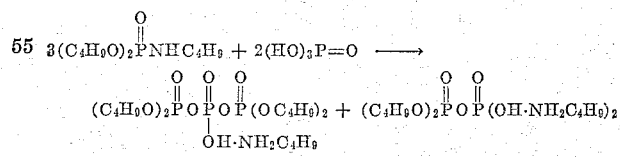

*Example 19*

Into a 4-ounce bottle containing 20 g. (0.204 mol) of anhydrous phosphoric acid was added 47.0 g. (0.205 mol) of diethyl phenylamidophosphate at 26–32° C. The resultant paste-like reaction mixture upon standing over night at 25° became a homogeneous, almost colorless, viscous liquid. It was then heated at 100° C. for about 22.75 hours to give a hard blue solid whose salt content was found to be 0.527 milliequivalent of perchloric acid per gram=0.035 equivalent (theory=0.204 equivalent for completion of the following reaction).

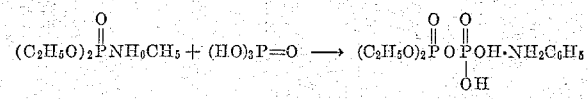

Example 20

Into a 4-ounce bottle containing 16 g. (0.163 mol) of anhydrous phosphoric acid was added 56 g. (0.244 mol) of diethyl phenylamidophosphate at 25–31° C. The reaction mixture was allowed to stand over night at 25° C., heated at 100° C. for about 23.25 hours, allowed to stand at 25° C. for 8 days, again heated at 100° C. for 5.5 hours, and allowed to stand over night at 25° C. The salt content of the resultant bluish solid was found to be 0.71 milliequivalent of perchloric acid per gram=0.051 equivalent (theory=0.244 mol for completion of the following reaction).

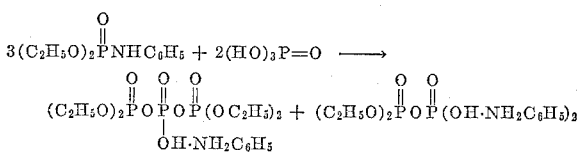

Example 21

Into 33.0 g. (0.443 equivalent of acid as determined by an acidity determination using bromcresol green-methyl red mixed indicator) of impure pyrophosphoric acid was added 51 g. (0.185 mol) of dibutyl butylamidophosphate over a period of 10 minutes. The reaction temperature went spontaneously from 25° to 76° C. After the addition, the reaction mixture was allowed to stand at 25° C. for about 22 hours, heated at 100° C. for 8 hours, allowed to stand at 25° C. for about 16 hours, heated at 100° C. for 5.5 hours, allowed to stand at 25° C. for 16 hours, and heated at 100° C. for 22.5 hours. The acidity (determined in the same manner as the starting acid) of the resultant reaction mixture was found to be 3.46 milliequivalents of base per gram=0.291 equivalent, indicating that 0.152 mol of dibutyl butylamidophosphate had reacted and that the reaction illustrated below was 82 percent complete.

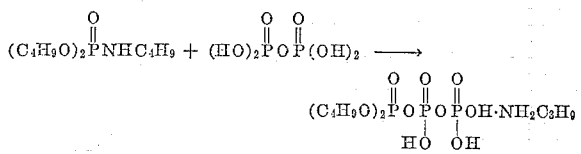

Example 22

Into 18 g. (0.242 equivalent of acid as determined by an acidity determination using bromcresol green-methyl red mixed indicator) of impure pyrophosphoric acid was added over a period of 5 minutes 56 g. (0.203 mol) of dibutyl butylamidophosphate. The reaction temperature went spontaneously from 25° to 55° C. After the addition the reaction mixture was allowed to stand at 25° C. for 22 hours, heated at 100° C. for 8 hours, allowed to stand at 25° C. about 16 hours, heated at 100° C. for 5.5 hours, again allowed to stand at 25° C. for about 16 hours, and heated at 100° C. for 22.5 hours. The acidity (determined in the same manner as the starting acid) of the reaction mixture was found to be 0.356 milliequivalent of base per gram=0.026 equivalent, indicating that 0.177 mol of dibutyl butylamidophosphate had reacted and that the reaction illustrated below was 87 percent complete.

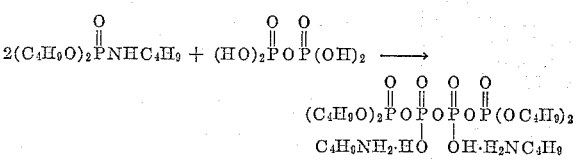

Example 23

Into 67.5 g. (0.179 mol) of diethyl di-(2-ethylhexyl)-amidophosphate was added 17.5 g. (0.179 mol) of anhydrous phosphoric acid over a period of 5 minutes. The reaction temperature went from 25° to 47° C. After the addition the reaction mixture during the next 20 days was heated at 50° C. for a total of about 6.5 hours and at 100° C. for about 230 hours. The salt content of the resultant clear, brown, viscous liquid was found to be 1.22 milliequivalents of perchloric acid per gram=0.104 equivalent (58.3 percent of the theoretical for completion of the following reaction).

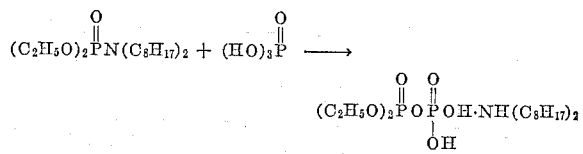

Example 24

Into 66.5 g. (0.176 mol) of diethyl di-(2-ethylhexyl)-amidophosphate was added 11.5 g. (0.117 mol) of anhydrous phosphoric acid over a period of 3 minutes. The reaction temperature went from 25° to 41° C. During the next 20 days the reaction mixture was heated at 50° C. for about 6.5 hours and at 100° C. for about 230 hours. The salt content of the resultant clear, brown, viscous liquid was found to be 1.20 milliequivalents of perchloric acid per gram=0.093 equivalent (53.0 percent of theory for completion of the following reaction).

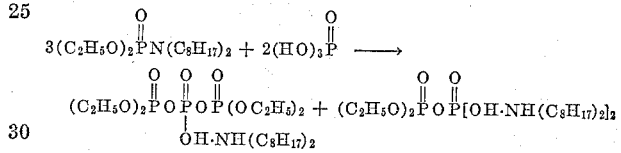

Example 25

Into 23.5 g. (0.316 equivalent of acid as determined by an acidity determination using bromcresol green-methyl red mixed indicator) of impure pyrophosphoric acid was added during 5 minutes 50 g. (0.132 mol) of diethyl di-(2-ethylhexyl)amidophosphate. The reaction temperature went from 25° to 55° C. After the addition, the reaction mixture was allowed to stand at 25° C. for 14 days and its acidity (determined in the same manner as the starting acid) was found to be 3.17 milliequivalents of base per gram=0.233 equivalent, indicating the following reaction to be 62.2 percent complete.

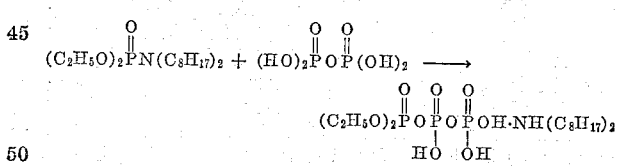

Example 26

Into 15.5 g. (0.208 equivalent of acid as determined by an acidity determination using bromcresol green-methyl red mixed indicator) of impure pyrophosphoric acid was added 66 g. of diethyl di-(2-ethylhexyl)amidophosphate. The reaction temperature went from 25° to 44° C. After the addition the reaction mixture was allowed to stand at 25° C. for 14 days and its acidity (determined in the same manner as the starting acid) was found to be 2.19 milliequivalents of base per gram=0.178 equivalent.

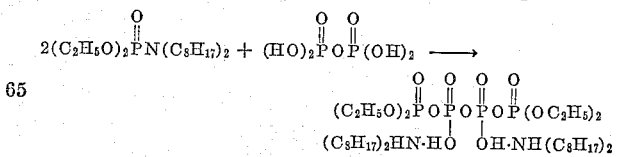

Example 27

One-tenth mol (15.3 g.) of diethyl amidophosphate, 9.8 g. (0.1 mol) of anhydrous phosphoric acid, and 1.0 g. of BF₃-ethyl ether (47%) were mixed together at 25° C. and the reaction temperature spontaneously went to 43° C. The reaction mixture was first a clear, yellow homogeneous solution which after five minutes became very hazy.

Upon standing over night at 25° C., the reaction mixture was an almost white wet solid. After standing at 25° C. for around 48 hours, the salt content of the pasty reaction mixture was found to be 2.28 milliequivalents of perchloric acid per gram=0.059 equivalent (theory=0.1 equivalent for completion of the following reaction).

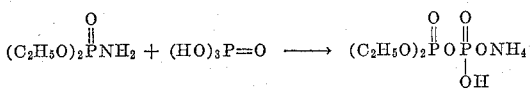

Example 28

Into 35.6 g. (0.478 equivalent as determined by an acidity determination using bromcresol green-methyl red mixed indicator) of agitated pyrophosphoric acid held at 40–50° C., with cooling, was added 47 g. (0.2 mol) of 2 - dimethylamido-5-ethyl-2-oxo-4-propyl-1,3,2-dioxaphosphorinane over a period of 45 minutes. Upon standing over night at 25° C. the reaction mixture was diluted by the addition of 50 g. of dry tetrahydrofuran. After standing 5 days at 25° C., 2.0 g. of distilled water was added followed by the addition of 11 g. of water five days later. The resultant two-layer reaction mixture was allowed to stand further for about a week at 25° C. and then stripped by distillation at 25° C./<2 mm. There was thus obtained 82.5 g. of viscous, dark yellow liquid residue product which had an acid content (determined in the same manner as the pyrophosphoric acid reactant) of 4.051 milliequivalents of KOH per gram=0.335 equivalent, indicating that the reaction illustrated below had reached 71.5 percent completion.

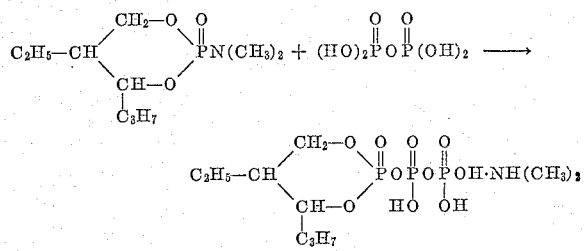

Example 29

Two-tenths mol (41.4 g.) of 2-amido-5-ethyl-2-oxo-4-propyl-1,3,2-dioxaphosphorinane and 35.6 g. (0.478 equivalent as determined by an acidity determination using bromcresol green-methyl red mixed indicator) of pyrophosphoric acid were mixed together in a 4-ounce, widemouth bottle. The reaction temperature immediately went from 25° C. to 46° C. The acid content of the resultant gray, tacky liquid was found to be (after standing at 25° C. for about 2 weeks) 4.631 milliequivalents of KOH per gram (determined in the same manner as the pyrophosphoric acid reactant)=0.357 equivalent. This indicates that the reaction represented below had reached 60.5 percent completion.

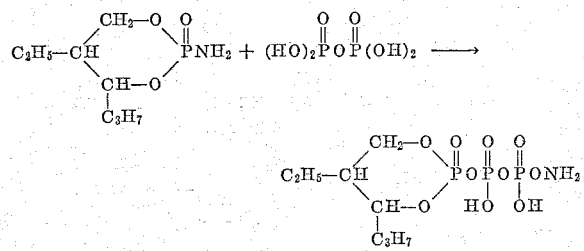

Example 30

Two-tenths mole (41.4 g.) of 2-amido-5-ethyl-2-oxo-4-propyl-1,3,2-dioxaphosphorinane and 19.6 g. (0.2 mol) of anhydrous phosphoric acid were mixed together in a 4-ounce, wide-mouth bottle. The reaction temperature went from 25° C. to 33° C. After the addition the reaction mixture was allowed to stand at 25° C. for about 17 days. The salt content of the resultant white tacky liquid was found to be 1.04 milliequivalents of perchloric acid per gram=0.064 equivalent, indicating that the following reaction had reached about 32 percent completion.

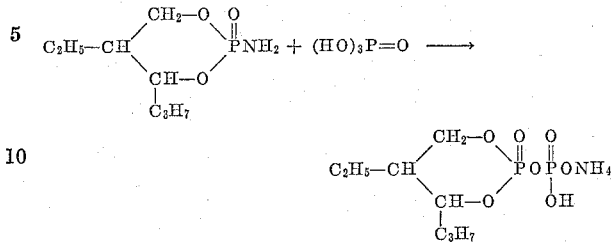

The products of this invention are useful as insecticides, fly repellants, herbicides and plant growth regulants. The effectiveness of several of the products as insecticides is illustrated in the following tables.

TABLE I

[$LD_{50}$ in mg./100 ml.]

| Example No. | Bean Aphid | Red Spider mite Adult | Housefly Poison Bait |
|---|---|---|---|
| 2 | | 6 | 35 |
| 4 | | 30 | |
| Malathion (Reference Compound) | 3 | 2 | 20 |

TABLE II

[$LD_{50}$ in ppm.]

| Example No. | Bean Aphid | Red Spider mite Adult | Housefly Poison Bait |
|---|---|---|---|
| 5 | 270 | 200 | 150 |
| 6 | 230 | | 450 |
| 7 | 100 | | |
| 10 | 300 | | 600 |
| 12 | | 1,200 | |
| 13 | 45 | | 200 |
| 14 | 50 | | 150 |
| 15 | 1,500 | | |
| 17 | | >2,500 | |
| 19 | | 1,500 | |
| 20 | | 350 | |
| 21 | | >2,500 | |
| 22 | 370 | 1,000 | |
| 25 | 1,000 | | 550 |
| 26 | 300 | 350 | |
| 27 | 50 | 120 | |
| Malathion (Reference Compound) | 60 | 120 | 12 |

What is claimed is:

1. A process which comprises reacting diethyl amidophosphate and pyrophosphoric acid.

2. A process which comprises reacting diethyl amidophosphate and polyphosphoric acid.

3. A process which comprises reacting dibutyl amidophosphate and polyphosphoric acid.

4. A process which comprises reacting diethyl dimethylamidophosphate and polyphosphoric acid.

5. A process which comprises reacting diethyl dimethylamidophosphate and polyphosphoric acid.

6. A process for producing an ammonium salt of a phosphorus acid anhydride which comprises reacting a polyphosphoric acid having at least 2 phosphorus atoms with a dialkylamidophosphate.

7. A method for killing insects which comprises contacting said insects with a lethal dose of a composition of the formula:

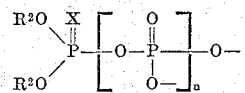

wherein $R^2$ is a member of the group consisting of alkyl and the two $R^2$ variables taken together to form lower alkylene, wherein X represents a member of the group consisting of oxygen and sulfur, wherein $n$ represents an integer having a value in the range of from 1 to 5, and wherein the valence to each O— individually is satisfied by a member of the group consisting of (a) hydrogen, (b) 

wherein R and $R^1$ individually are members of the group consisting of hydrogen, phenyl, and alkyl, and (c) 

wherein X and $R^2$ are as defined above; provided that at least one O— is bonded to a

group.

References Cited in the file of this patent

UNITED STATES PATENTS

| | | |
|---|---|---|
| 2,053,653 | Butz | Sept. 8, 1936 |
| 2,176,080 | Katzman | Oct. 17, 1939 |
| 2,190,769 | Butz | Feb. 20, 1940 |
| 2,664,400 | Woodstock et al. | Dec. 29, 1953 |
| 2,742,379 | Schofield | Apr. 17, 1956 |
| 2,756,175 | Goldstein et al. | July 24, 1956 |
| 2,848,414 | Chenicek | Aug. 19, 1958 |
| 2,865,945 | Kamlet | Dec. 23, 1958 |

OTHER REFERENCES

Cronje: "Chem. Abst.," vol. 44, col. 3878–3879 (1950).
Eggerer et al.: "Ann." May 1960, vol. 630, pages 58–70.
Lynen et al.: "Angew. Chem.," Nov. 21, 1960, vol. 72, No. 22.